United States Patent
Ozawa et al.

(10) Patent No.: US 7,511,389 B2
(45) Date of Patent: Mar. 31, 2009

(54) EMERGENCY ELECTRIC POWER SUPPLY UNIT

(75) Inventors: Tadahiko Ozawa, Tokyo (JP); Tetsuo Torii, Tokyo (JP); Norio Ashitate, Tokyo (JP); Iwao Sagara, Tokyo (JP)

(73) Assignees: Kayaba Industry Co., Ltd., Tokyo (JP); Ashitate Electric Co., Ltd., Tokyo (JP)

( * ) Notice: Subject to any disclaimer, the term of this patent is extended or adjusted under 35 U.S.C. 154(b) by 139 days.

(21) Appl. No.: 11/791,859

(22) PCT Filed: Nov. 29, 2005

(86) PCT No.: PCT/JP2005/022247

§ 371 (c)(1),
(2), (4) Date: May 30, 2007

(87) PCT Pub. No.: WO2006/059751

PCT Pub. Date: Jun. 8, 2006

(65) Prior Publication Data

US 2007/0262649 A1 Nov. 15, 2007

(30) Foreign Application Priority Data

Nov. 30, 2004 (JP) ............................. 2004-345960
Nov. 30, 2004 (JP) ............................. 2004-345975

(51) Int. Cl.
*H02P 9/00* (2006.01)

(52) U.S. Cl. ............................. 307/64; 307/66; 307/9.1; 307/10.1

(58) Field of Classification Search ............. 307/64–66, 307/9.1, 10.1; 180/65.2; 318/139; 320/132
See application file for complete search history.

(56) References Cited

U.S. PATENT DOCUMENTS 6,114,775 A * 9/2000 Chung et al. ............... 307/10.1

(Continued)

FOREIGN PATENT DOCUMENTS

JP 2000-278885 10/2000

(Continued)

*Primary Examiner*—Albert W Paladini
(74) *Attorney, Agent, or Firm*—Rabin & Berdo, P.C.

(57) ABSTRACT

An emergency electric power supply unit (9) for backing up the main electric power supply system (1, 10) at the time of the malfunction of the main electric power supply system (1, 10) which includes an industrial apparatus operated by cooperatively controlling an auxiliary machinery (2) operated by the electric power supplied from the main electric power supply system (1, 10), an auxiliary electric power supply (20) for storing the electric power, a charging circuit (21) for charging the electric power supplied from the main electric power supply (1) in the auxiliary electric power supply (20), a discharging circuit (22) for supplying the electric power charged in the auxiliary electric power supply (20) to the auxiliary machinery (2), and an emergency controlling circuit (40) for controlling the discharging circuit (22) so that the electric power from the auxiliary electric power supply (20) is supplied to the auxiliary machinery (2) at the time of the malfunction of the main electric power supply system (1, 10) and for controlling the operation of the auxiliary machinery (2) in response to the operational state of the industrial apparatus at the time of the malfunction of the main electric power supply system (1, 10).

6 Claims, 3 Drawing Sheets

U.S. PATENT DOCUMENTS

| | | | |
|---|---|---|---|
| 6,455,949 B1 * | 9/2002 | Blauensteiner et al. | 307/10.1 |
| 6,566,765 B1 * | 5/2003 | Nitschke et al. | 307/10.1 |
| 6,690,095 B2 * | 2/2004 | Mederer | 307/9.1 |
| 7,151,326 B2 * | 12/2006 | Jordan | 307/22 |
| 2002/0121879 A1 | 9/2002 | Inoue | |

FOREIGN PATENT DOCUMENTS

| | | |
|---|---|---|
| JP | 2002-064946 | 2/2002 |
| JP | 2003-237607 | 8/2003 |
| JP | 2004-322987 | 11/2004 |
| WO | WO-02/01695 | 1/2002 |

* cited by examiner

EMERGENCY ELECTRIC POWER SUPPLY UNIT

FIELD OF THE INVENTION

The present invention relates to an emergency electric power supply unit.

BACKGROUND OF THE INVENTION

In recent years, engines, transmissions, brakes, steering or the like have been progressively controlled electronically in motor vehicles, and a cooperative control is performed by trans-communicating information between respective controllers through communication circuits.

However, with the motor vehicle installed with such electronic control units, there is a possibility that the entire electronic control units become non-operatable when a failure of the main battery is caused at the time of an accident of the vehicle or the like.

An emergency notifying system which is installed on a vehicle that changes over a supply of electrical power to an auxiliary battery when the main battery is failed at the time of an accident or the like is disclosed in JP2000-278885.

SUMMARY OF THE INVENTION

However, with regard to such conventional system, even though the electric power is supplied by changing over to the auxiliary electric power supply from the main electric power supply when the main battery is failed at the time of the accident of the vehicle, there was a possibility that a secondary failure may be caused because the responsive operational control of the vehicle was not performed at the time of the malfunction of this main electric power supply.

The present invention has been designed in consideration of the above mentioned problems, and it is an object thereof to provide the emergency electric power supply unit which is respondable at the time of the malfunction of the main electric power supply.

In order to achieve above object, the present invention provides an emergency electric power supply unit for backing up a main electric power supply system at the time of the malfunction of the main electric power supply system. The emergency electric power supply unit comprises an industrial apparatus operated by cooperatively controlling an auxiliary machinery operated by the electric power supplied from the main electric power supply system, an auxiliary electric power supply for storing the electric power, a charging circuit for charging the electric power supplied from the main electric power supply in the auxiliary electric power supply, a discharging circuit for supplying the electric power charged in the auxiliary electric power supply to the auxiliary machinery, and an emergency controlling circuit for controlling the discharging circuit so that the electric power from the auxiliary electric power supply is supplied to the auxiliary machinery at the time of the malfunction of the main electric power supply system and for controlling the operation of the auxiliary machinery in response to the operational state of the industrial apparatus at the time of the malfunction of the main electric power supply system.

According to the present invention, when a failure is caused with a main electric power supply system, electric power is supplied to auxiliary machineries by an emergency controlling circuit and the auxiliary machineries are controlled in response to the operational states of industrial apparatus at the time of the malfunction of the main electric power supply system, thereby the secondary failure can be prevented and in consequence, the occurrence of further accident or the like can be prevented.

DESCRIPTION OF THE PREFERRED EMBODIMENTS

In the following, the embodiment of the present invention is described with reference to the accompanying drawings.

Embodiment 1

Figure 1:
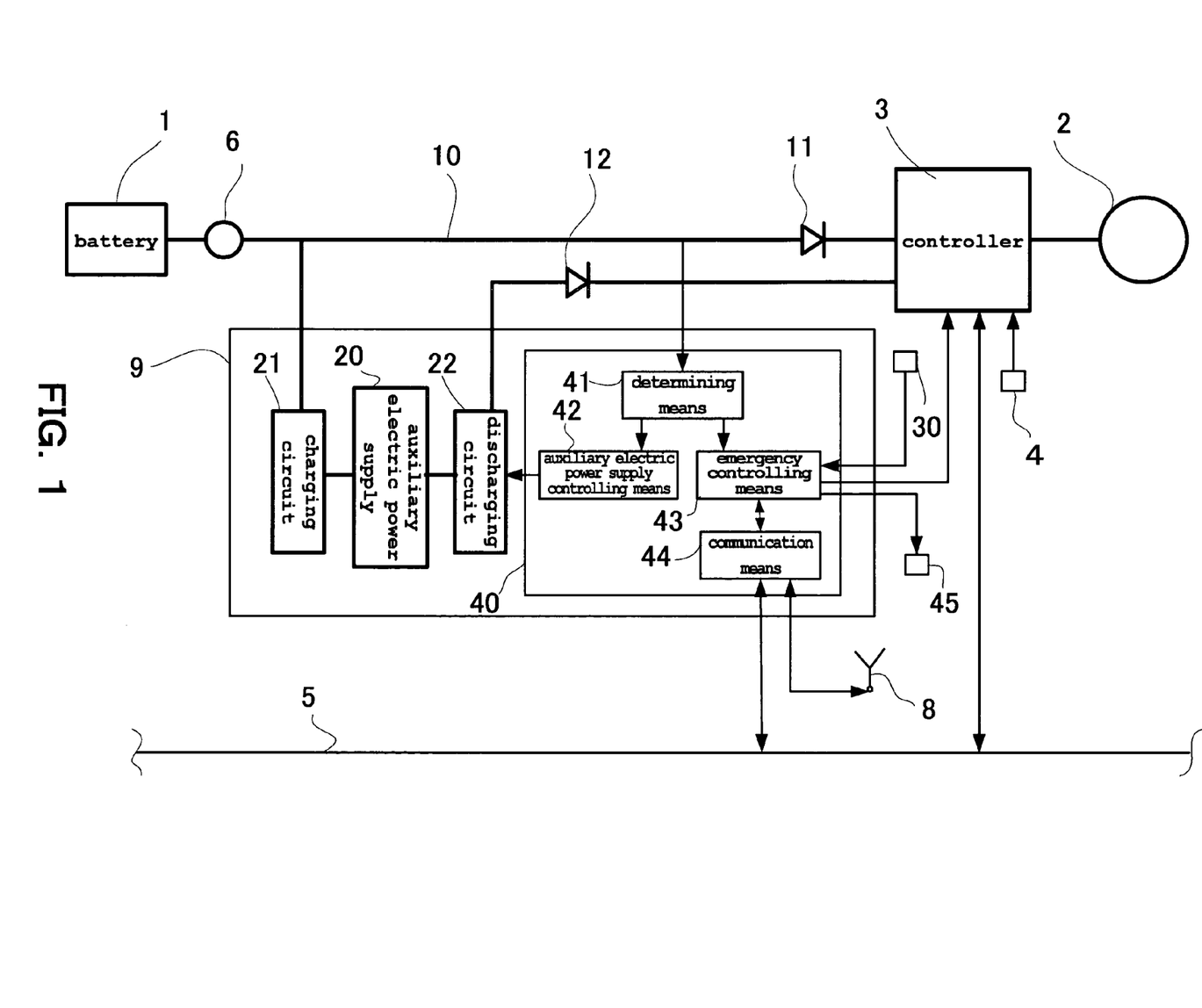
FIG. 1 is a block diagram showing the construction that the emergency electric power supply unit according to the present embodiment 1 is applied to a power steering unit of a vehicle.

A description is given to the emergency electric power supply unit according to the embodiment 1 of the present invention with reference to FIG. 1. FIG. 1 is a block diagram showing the construction that the emergency electric power supply unit according to the present embodiment 1 is applied to a power steering unit of a vehicle.

The power steering unit is that mounted on the vehicle serving as the industrial apparatus, and comprises a battery 1 serving as a main electric power supply, a main electric power supply circuit 10 connected to the battery 1 through an ignition switch 6, an assisting motor 2 which is driven by the electric power supplied from the battery 1 to provide assisting force to a steering shaft (not illustrated), a controller 3 for controlling the operation of the assisting motor 2, and an emergency electric power supply unit 9 activated at the time of the malfunction of the main electric power supply system constructed from the battery 1 and the main electric power supply circuit 10 to back up the main electric power supply system.

Further, the power steering unit comprises a sensor 4 for detecting a steering angle and a steering torque and outputting the detected information to a controller 3, and a communication circuit 5 with which the controller 3 sends or receives the information with the other controllers (not illustrated).

The assisting motor 2 is a one of the auxiliary machineries of the vehicle operated by the electric power supplied from the main electric power supply systems 1, 10, and the movement of the vehicle is controlled by cooperatively controlling these auxiliary machineries.

The emergency electric power supply unit 9 comprises an auxiliary electric power supply 20 for storing electric power; a charging circuit 21 for charging the electric power supplied from the main electric power supply circuit 10 in the auxiliary electric power supply 20; a discharging circuit 22 for supplying the electric power charged in the auxiliary electric power supply 20 to the assisting motor 2 through the controller 3 at the time of the malfunction of the main electric power supply systems 1, 10; and an emergency controlling circuit 40 for determining the time of the malfunction of the main electric power supply systems 1, 10, and for controlling the discharging circuit 22 and the operation of the assisting motor 2 at the time of the malfunction.

Diodes 11, 12 are interveningly provided in the main electric power supply circuit 10 and the discharging circuit 22 respectively to block the reverse flow of the current.

The auxiliary electric power supply 20 is constructed from an electric double layer capacitor. The electric double layer capacitor comprises a pair of electrode structures having high surface area material and for storing electrical charge, and an ionic conductive substance interveningly provided between each of the electrode structures, thereby the electric double layer is formed between the high surface area material of the electrode structure and the electrolyte of the ionic conductive substance.

The charging circuit 21 conducts a charging and discharging control so that the charged state of the auxiliary electric power supply 20 is in the predetermined range. The lower limit of the predetermined range is set to the minimum state required to drive the assisting motor 2, and the upper limit of the predetermined range is set to the state that does not exceeds the rated voltage of the electric double layer capacitor.

The emergency controlling circuit 40 is constructed from MPU (microprocessor unit), FPROM (field programmable read only memory) or the like as main bodies.

The emergency controlling circuit 40 comprises a malfunction determining means 41 for determining the time of the malfunction of the main electric power supply systems 1, 10, an auxiliary electric power supply controlling means 42 for outputting a signal to the discharging circuit 22 so that the electric power of the auxiliary electric power supply 20 is output to a controller 3 at the time of the malfunction of the main electric power supply systems 1, 10, an emergency controlling means 43 for outputting a signal to the controller 3 for controlling the operation of the assisting motor 2 in response to the operational state of the vehicle at the time of the malfunction of the main electric power supply systems 1, 10, and a communication means 44 for sending or receiving the information related to the vehicle with the other controllers through the communication circuit 5 or radio antenna 8.

The malfunction determining means 41 detects the voltage of the main electric power supply circuit 10, and determines that it is the time of the normal function of the main electric power supply circuit 10 if this detected voltage is equal to or higher than the predetermined value, and determines that it is the time of the malfunction of the main electric power supply circuit 10 if the detected voltage is lower than the predetermined value.

An emergency sensor 30 is connected to the emergency controlling means 43 serving as an emergency detector for detecting the steering state at the time of the malfunction of the main electric power supply systems 1, 10.

The detection signal by the emergency sensor 30 and the operational information of the vehicle from the communication means 44 through the communication circuit 5 or the radio antenna 8 are input together with the determination result from the malfunction determining means 41 to the emergency controlling means 43. The emergency controlling means 43 then outputs, based on these input information, the signal to the controller 3 for controlling the operation of the assisting motor 2 in response to the operational state of the vehicle, that is the steering state and the operational state of the vehicle, at the time of the malfunction of the main electric power supply systems 1, 10.

In addition, an alarm 45 is connected to the emergency controlling means 43, and the emergency controlling means 43 activates the alarm 45 at the time of the malfunction of the main electric power supply systems 1, 10 to notify an operator of the malfunction of the main electric power supply circuit 10.

Alternatively, the communication means 44 sends the information for notifying the malfunction of the main electric power supply systems 1, 10 to other on-board controllers which are not illustrated through the communication circuit 5, the radio antenna 8 or the like.

Next, a description is given as to the operation of the power steering unit.

At the time of the normal operation during which the main electric power supply systems 1, 10 function normally when the ignition switch 6 is set to ON, the electric power is supplied from the main electric power supply circuit 10 to the controller 3. The controller 3 outputs the driving current to the assisting motor 2 based on the operational information of the vehicle such as the detection signal from the sensor 4 and the speed signal of the vehicle received through the communication circuit 5. Thereby, the appropriate assisting force is provided by the assisting motor 2 to the steering shaft to reduce the steering force required by the operator.

The electric power from the main electric power supply circuit 10 is charged in the electric double layer capacitor of the auxiliary electric power supply 20, at the time of the normal operation. The electric double layer capacitor has a long charging and discharging cycle life as well as a high charging efficiency compared to the rechargeable battery utilising chemical reactions, and requires almost no maintenance.

When it is detected as the time of the malfunction of the main electric power supply systems 1, 10 by the malfunction determining means 41, the emergency electric power supply unit 9 is automatically activated. The time of the malfunction of the main electric power supply systems 1, 10 means that, for example, the case where the output voltage becomes lower than the predetermined value due to the deterioration of the battery 1, and the case where the main electric power supply circuit 10 is disconnected by the occurrence of accident etc. or the like.

At the such time of the malfunction of the main electric power supply systems 1, 10, auxiliary electric power supply controlling means 42 controls the discharging circuit 22 so that the electric power from the auxiliary electric power supply 20 is supplied to the assisting motor 2 through the controller 3. In addition, the emergency controlling means 43 outputs the signal to the controller 3 for controlling the operation of the assisting motor 2 in response to the steering state detected by the emergency sensor 30 and the operational state of the vehicle received by the communication means 44. Thereby, the assisting motor 2 is operated by using the auxiliary electric power supply 20 as a power source in response to the operational state of the vehicle at the time of the malfunction of the main electric power supply systems 1, 10.

Thus, according to the present embodiment 1, the emergency electric power supply unit 9 is operated so that the electric power from the auxiliary electric power supply 20 is supplied to the assisting motor 2 through the controller 3 and at the same time, the operation of the assisting motor 2 is controlled in response to the operational state of the vehicle at the time of the malfunction of the main electric power supply systems 1, 10. Therefore, even when the malfunction is caused to the main electric power supply systems 1, 10 by accident or the like of the vehicle, the assisting force required of the steering shaft is provided by the assisting motor 2 to enable steering by the operator.

In addition, since the emergency sensor 30 is provided, even when the signal from the sensor 4 for detecting the steering angle and the steering torque is lost at the time of the malfunction of the main electric power supply systems 1, 10, it will be possible for the emergency electric power supply unit 9 to control the operation of the assisting motor 2 in response to the detection signal from the emergency sensor 30.

In addition, the emergency controlling circuit 40 is provided with the communication means 44 for sending the information reporting the malfunction of the main electric power supply systems 1, 10 to the other on-board controllers through the communication circuit 5 or the radio antenna 8, thereby it is possible to prevent secondary failures and the like by conducting the cooperative control with the each of the on-board controllers adapted to the malfunction of the main electric power supply circuit 10.

Further, since the emergency electric power supply unit 9 is provided with the auxiliary electric power supply 20, the charging circuit 21, and the emergency controlling circuit 40 which are made into a unit, they can be positioned in the vicinity of the controller 3. Thus, even when the battery 1 or the like of the main electric power supply system is damaged at the time of the accident, the emergency electric power supply unit 9 is less likely to be damaged and the possibility that the operation of the power steering unit by the emergency electric power supply unit 9 is maintained can be improved.

In addition, in the above described embodiment 1, it is specified that the operation of the assisting motor 2 is controlled by the emergency controlling means 43 in response to both of the steering state and the operational state of the vehicle, however, the operation of the assisting motor 2 may be controlled in response to the either one of the steering state or the operational state of the vehicle.

In addition, it is also possible to, upon inputting the information related to the operator, road or the like to the emergency controlling circuit 40 through the communication circuit 5, automatically steer through the assisting motor 2 without requiring steering maneuvers by the operator to control the vehicle so that the vehicle is guided to an emergency stopping position.

Embodiment 2

Figure 2:
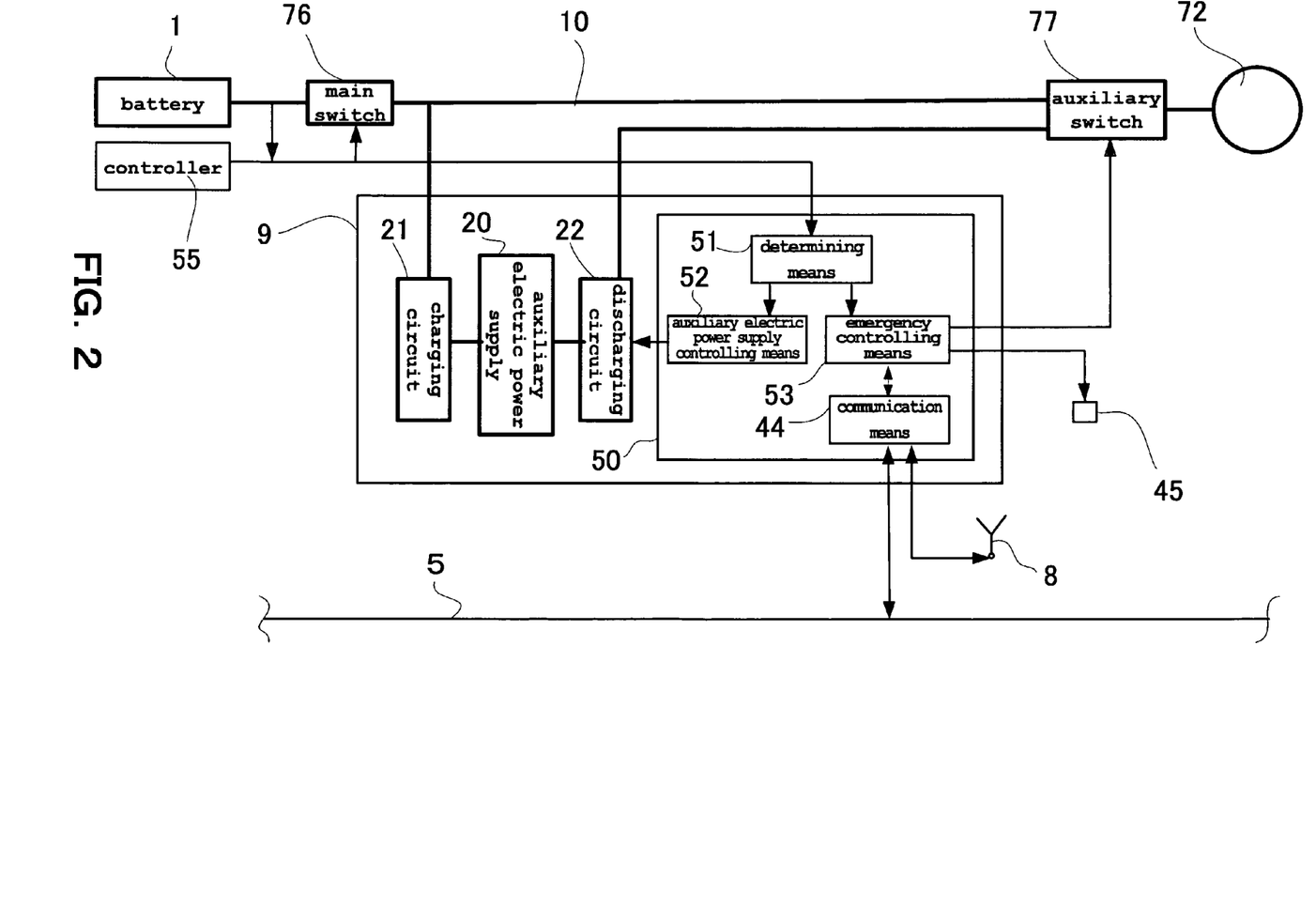
FIG. 2 is a block diagram showing the construction that the emergency electric power supply unit according to the present embodiment 2 is applied to a rear position lamp unit of a vehicle.

A description is given to the emergency electric power supply unit according to the embodiment 2 of the present invention with reference to FIG. 2. FIG. 2 is a block diagram showing the construction that the emergency electric power supply unit according to the present embodiment 2 is applied to a rear position lamp unit of a vehicle. In addition, the identical numerical figures are designated and detailed descriptions are omitted for the same constructions as in the above described embodiment 1.

The rear position lamp unit is that mounted on the vehicle serving as the industrial apparatus, and comprises a battery 1 serving as the main electric power supply, a main electric power supply circuit 10 connected to the battery 1, a main switch 76 and an auxiliary switch 77 interveningly provided in series to the main electric power supply circuit 10, a rear position lamp 72 provided at the rear of the vehicle and operated by the main switch 76 and the auxiliary switch 77, a controller 55 for outputting a command signal to the main switch 76 and the auxiliary switch 77, and an emergency electric power supply unit 9 which is operated at the malfunction of the main electric power supply system constructed from the battery 1 and the main electric power supply circuit 10 to back up the main electric power supply system.

The rear position lamp 72 is one of the auxiliary machineries of the vehicle operated by the electric power supplied from the main electric power supply systems 1, 10, and the movement of the vehicle is controlled by cooperatively controlling these auxiliary machineries.

The main switch 76 is shifted between ON/OFF by the command signal output from the controller 55, thereby switching over between a supplying state and a non-supplying state of the electric power from the battery 1 to the rear position lamp 72.

The auxiliary switch 77 has a position that the electric power from the main electric power supply circuit 10 is guided to the rear position lamp 72 and a position that the electric power from the emergency electric power supply unit 9 is guided to the rear position lamp, and the positions are shifted according to the command signal output from the emergency electric power supply unit 9.

The emergency electric power supply unit 9 comprises an auxiliary electric power supply 20 for storing the electric power, a charging circuit 21 for charging the electric power supplied from the main electric power supply circuit 10 in the auxiliary electric power supply 20, a discharging circuit 22 for supplying the electric power charged in the auxiliary electric power supply 20 to the rear position lamp 72 through the auxiliary switch 77 at the time of the malfunction of the main electric power supply systems 1, 10, and an emergency controlling circuit 50 for determining the time of the malfunction of the main electric power supply systems 1, 10 and controlling the operation of the discharging circuit 22 and the rear position lamp 72 at the time of the malfunction.

The emergency controlling circuit 50 comprises a malfunction determining means 51 for determining the time of the malfunction of the main electric power supply systems 1, 10, an auxiliary electric power supply controlling means 52 for outputting a signal to the discharging circuit 22 so that the electric power from the auxiliary electric power supply 20 is output to the rear position lamp 72 at the time of the malfunction of the main electric power supply systems 1, 10, an emergency controlling means 53 for outputting a signal to the auxiliary switch 77 for controlling the operation of the rear position lamp 72 in response to the operational state of the vehicle at the time of the malfunction of the main electric power supply systems 1, 10, and a communication means 44 for sending and receiving the information related to the vehicle with the other controllers (not illustrated) through the communication circuit 5 or the radio antenna 8.

The malfunction determining means 51 detects the voltage of the main electric power supply circuit 10 and at the same time, the command signal which is output to the main switch 76 from the controller 55 is entered. Then, the malfunction determining means 51 determines that it is the time of the normal function of the main electric power supply circuit 10 if the voltage of the main electric power supply circuit 10 at the state that the main switch 76 is ON is equal to or higher than the predetermined value, on the other hand, determines that it is the time of the malfunction of the main electric power supply circuit 10 if the voltage of the main electric power supply circuit 10 at the state that the main switch 76 is ON is lower than the predetermined value.

The operational information of the vehicle is input from the communication means 44 through the communication circuit 5 or the radio antenna 8 together with the determination result of the malfunction determining means 51 to the emergency controlling means 53. Then, the emergency controlling means 53 outputs the signal to the auxiliary switch 77 for controlling the operation of the rear position lamp 72, based on the information input, in response to the operational state of the vehicle at the time of the malfunction of the main electric power supply systems 1, 10.

Next, a description is given as to the operation of the rear position lamp unit.

At the time of the normal operation during which the main electric power supply systems 1, 10 function normally, the electric power from the main electric power supply circuit 10 is supplied to the rear position lamp 72 through the main switch 76, and rear position lamp 72 is turned on. During which, the electric power from the main electric power supply circuit 10 is charged in the electric double layer capacitor of the auxiliary electric power supply 20.

When it is detected as the time of the malfunction of the main electric power supply systems 1, 10 by the malfunction determining means 51, the emergency electric power supply unit 9 is automatically activated. At the time of the malfunction of the main electric power supply systems 1, 10, the auxiliary electric power supply controlling means 52 controls the discharging circuit 22 so that the electric power from the auxiliary electric power supply 20 is supplied to the rear position lamp 72. In addition, the emergency controlling means 53 outputs the signal to the auxiliary switch 77 for controlling the operation of the rear position lamp 72 in response to the operational state of the vehicle received by the communication means 44. Thereby, the rear position lamp 72 is operated by using the auxiliary electric power supply 20 as a power source, correspondingly to the operational state of the vehicle at the time of the malfunction of the main electric power supply systems 1, 10.

Thus, in accordance with the present embodiment 2, it is so constructed that the main switch 76 and the auxiliary switch 77 are interveningly provided in series to the main electric power supply circuit 10, the rear position lamp 72 is turned on by the electric power from the battery 1 through the main switch 76 at the time of the normal operation during which the main electric power supply systems 1, 10 function normally, and rear position lamp 72 is turned on by the electric power from the auxiliary electric power supply 20 through the auxiliary switch 77 at the time of the malfunction of the main electric power supply systems 1, 10, thereby, even when the main electric power supply circuit 10 is disconnected by the accident or the like of the vehicle, the rear position lamp 72 is turned on in the mode of the emergency to make it possible to notify the own presence to the following vehicles or the like. Further, it will be possible to design the simplification of the circuit construction, and to prevent the disconnection of the circuit by the accidents or the like.

Embodiment 3

Figure 3:
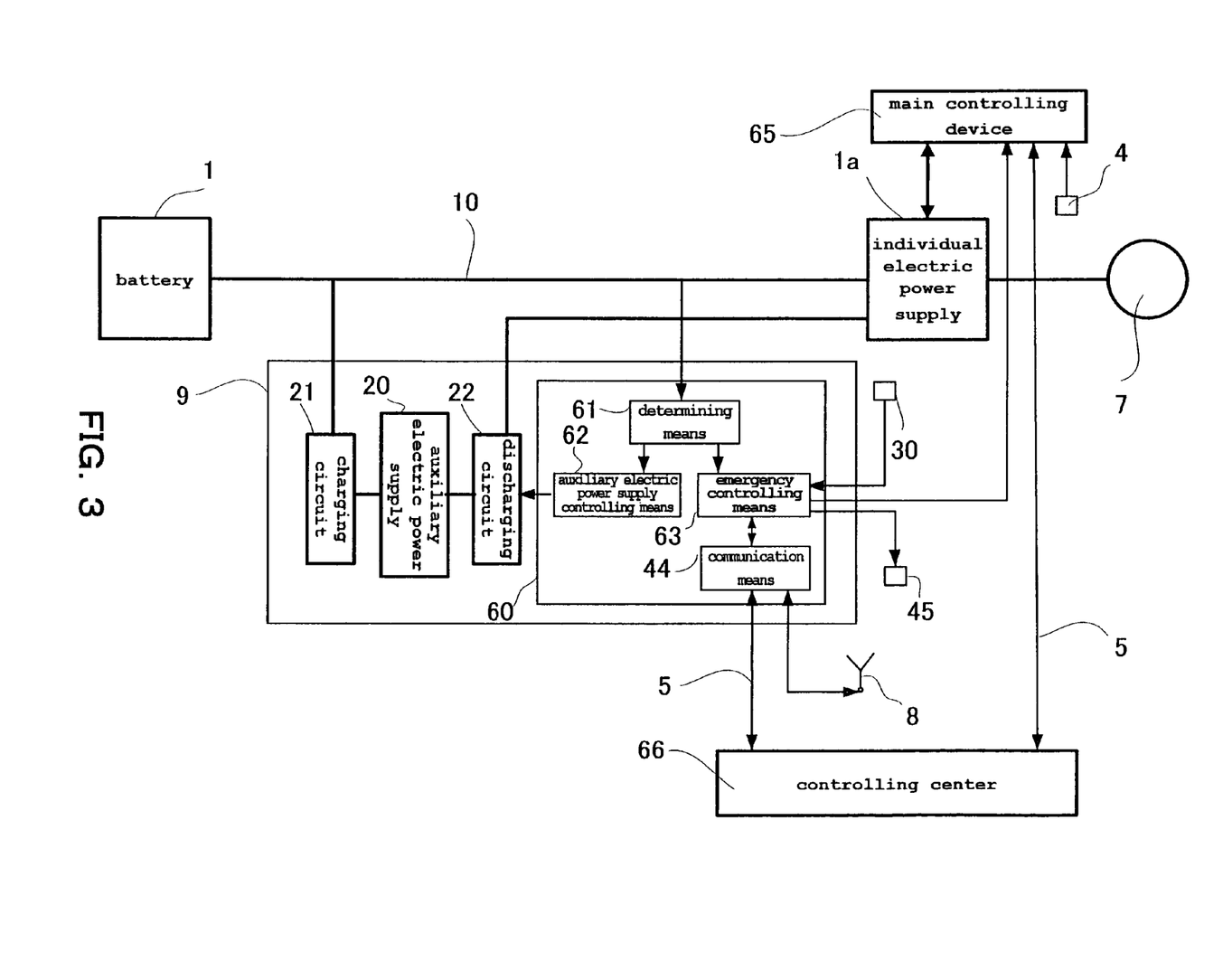
FIG. 3 is a block diagram showing the construction that the emergency electric power supply unit according to the present embodiment 3 is applied to an industrial plant.

A description is given to the emergency electric power supply unit according to the embodiment 3 of the present invention with reference to FIG. 3. FIG. 3 is a block diagram showing the construction that the emergency electric power supply unit according to the present embodiment 3 is applied to an industrial plant. In addition, the identical numerical figures are designated and detailed descriptions are omitted for the same constructions as in the above described embodiment 1.

Industrial plants into which the emergency electric power supply unit according to the present embodiment 3 is applied include industrial apparatus of chemical plants, electric power plants, production lines or the like which are those operated by cooperatively controlling a plurality of auxiliary machineries such as motors, fans, heat treat furnaces, electric operated valves or the like in accordance with commands from a control center.

The industrial plant comprises a main electric power supply 1, a main electric power supply circuit 10 connected to the main electric power supply 1, an individual electric power supply 1a of respective auxiliary machineries 7 into which the electric power from the main electric power supply 1 is supplied, the auxiliary machineries 7 such as motors, heat treat furnaces, electric operated valves or the like which are driven by the electric power supplied from the electric power supply 1a, a main controlling device 65 for controlling the operation of the auxiliary machineries 7, a controlling center 66 for commanding the main controlling device 65, and an emergency electric power supply unit 9 activated at the time of the malfunction of the main electric power supply system constructed from the main electric power supply 1 and the main electric power supply circuit 10, to back up the main electric power supply system.

In addition, the industrial plant comprises a sensor 4 for detecting the operational state of the auxiliary machineries 7 and outputting the detected information to the main controlling device 65, and a communication circuit 5 for sending and receiving the information between the main controlling device 65 and the controlling center 66.

The emergency electric power supply unit 9 comprises an auxiliary electric power supply 20 for storing the electric power, a charging circuit 21 for charging alternative current power supplied from the main electric power supply circuit 10 in the auxiliary electric power supply 20 after converting it into direct current power, a discharging circuit 22 for supplying the direct current power charged in the auxiliary electric power supply 20 to the individual electric power supply 1a after converting it into alternative current power at the time of the malfunction of the main electric power supply systems 1, 10, and an emergency controlling circuit 60 for determining the time of the malfunction of the main electric power supply systems 1, 10 and controlling the discharging circuit 22 and the operation of the auxiliary machineries 7 at the time of the malfunction.

The emergency controlling circuit 60 comprises a malfunction determining means 61 for determining the time of the malfunction of the main electric power supply systems 1, 10, an auxiliary electric power supply controlling means 62 for outputting the signal to the discharging circuit 22 so that the electric power from the auxiliary electric power supply 20 is output to the individual electric power supply 1a at the time of the malfunction of the main electric power supply systems 1, 10, an emergency controlling means 63 for controlling the operation of the auxiliary machineries 7 in response to the operational state of the industrial plant at the time of the malfunction of the main electric power supply systems 1, 10, and a communication means 44 for sending and receiving the information with the controlling center 66 through the communication circuit 5 or the radio antenna 8.

The malfunction determining means 61 detects the voltage of the main electric power supply circuit 10, and determines that it is the time of the normal function of the main electric power supply circuit 10 if this detected voltage is equal to or higher than the predetermined value, and determines that it is the time of the malfunction of the main electric power supply circuit 10 if this detected voltage is lower than the predetermined value.

An emergency sensor 30 for detecting the operational state of the auxiliary machineries 7 at the time of the malfunction of the main electric power supply systems 1, 10 is connected to the emergency controlling means 63.

The detection signal by the emergency sensor 30 and the operational information of the industrial plant from the communication means 44 through the communication circuit 5 or the radio antenna 8 are input together with the determination result of the malfunction determining means 61 to the emergency controlling means 63. Then, the emergency controlling means 63 outputs the signal to the main controlling device 65 for controlling the operation of the auxiliary machineries 7, based on these input information, in response to the operational state of the industrial plant, that is the operational state of the auxiliary machineries 7 and the all of the plant at the time of the malfunction of the main electric power supply systems 1, 10.

Next, a description is given as to the operation of the industrial plant.

At the time of the normal operation during which the main electric power supply systems 1, 10 function normally, the electric power from the main electric power supply circuit 10 is supplied to the individual electric power supply 1a. The main controlling device 65 outputs the driving current to the auxiliary machineries 7 based on the detection signal from the sensor 4 and the operational information of the industrial plant received from the controlling center 66 through the communication circuit 5. During this time of the normal operation, the electric power from the main electric power supply circuit 10 is charged in the electric double layer capacitor of the auxiliary electric power supply 20.

When it is detected as the time of the malfunction of the main electric power supply systems 1, 10 by the malfunction determining means 61, the emergency electric power supply unit 9 is automatically activated. At the time of the malfunction of the main electric power supply systems 1, 10, the auxiliary electric power supply controlling means 62 controls the discharging circuit 22 so that the electric power from the auxiliary electric power supply 20 is supplied to the individual electric power supply 1a. In addition, the emergency controlling means 63 outputs the signal to the main controlling device 65 for controlling the operation of the auxiliary machineries 7 in response to the operational state of the auxiliary machineries 7 detected by the emergency sensor 30 and the operational state of the industrial plant received by the communication means 44. Thereby, the auxiliary machineries 7 are operated by using the auxiliary electric power supply 20 as a power source, in response to the operational state of the industrial plant at the time of the malfunction of the main electric power supply systems 1, 10.

In the industrial plants, when the main electric power supply 1 is interrupted or the main electric power supply circuit 10 is disconnected suddenly by an earth quake and a fire, the electric power from the main electric power supply 1 will not be supplied to the respective auxiliary machineries 7, therefore it will be impossible to control each of the auxiliary machineries 7 by the controlling center 66. However, according to the present embodiment 3, the emergency electric power supply unit 9 is operated so as to supply the electric power from the auxiliary electric power supply 20 to the individual electric power supply 1a and at the same time controls the operation of the auxiliary machineries 7 in response to the operational state of the industrial plant at the time of the malfunction of the main electric power supply systems 1, 10, thereby, it is possible to stably control main devices such as chemical agent supplying facilities, heat treat furnaces or the like even at the time of the malfunction of the main electric power supply systems 1, 10.

In addition, in the above described embodiment 3, the operation of the auxiliary machineries 7 is controlled by the emergency controlling means 63 in response to both of the operational state of the auxiliary machineries and the operational state of the industrial plant, the operational state of the auxiliary machineries 7 may be controlled in response to either one of the operational state of the auxiliary machineries or the operational state of the industrial plant.

Further, when the main controlling device 65 is operated by the supplied electric power from the main electric power supply 1, the main controlling device 65 will not stop even at the time of the malfunction of the main electric power supply systems 1, 10 if the electric power from the auxiliary electric power supply 20 is supplied to the individual electric power supply of the main controlling device 65 at the time of the malfunction of the main electric power supply systems 1, 10.

It is apparent that various modifications may be made to the present invention within the limit of the technical idea thereof, without being limited by the above described embodiment.

For example, it is possible to apply the emergency electric power supply unit 9 to the other devices by changing the details of the control which are saved in FPROM of the emergency controlling circuit 40, 50, 60.

In addition, not only the electric double layer capacitor but also for example, lead-acid batteries, alkaline batteries, fuel cells or the like may be used in the auxiliary electric power supply 20.

Further, it may be constructed that the electric power charged in the auxiliary electric power supply 20 is not only charged by the main electric power supply circuit 10 but also supplied from solar cell or the like.

INDUSTRIAL APPLICABILITY

The emergency electric power supply unit of the present invention can be applied to not only the power steering unit, the rear position lamp of the vehicle but also to the other devices such as power window device, head light and the like.

The invention claimed is:

1. An emergency electric power supply unit for backing up a main electric power supply system at the time of the malfunction of the main electric power supply system comprising:
    an industrial apparatus operated by cooperatively controlling an auxiliary machinery operated by the electric power supplied from the main electric power supply system;
    an auxiliary electric power supply for storing the electric power;
    a charging circuit for charging the electric power supplied from the main electric power supply in the auxiliary electric power supply;
    a discharging circuit for supplying the electric power charged in the auxiliary electric power supply to the auxiliary machinery; and
    an emergency controlling circuit for controlling the discharging circuit so that the electric power from the auxiliary electric power supply is supplied to the auxiliary machinery at the time of the malfunction of the main electric power supply system, and for controlling the operation of the auxiliary machinery in response to the operational state of the industrial apparatus at the time of the malfunction of the main electric power supply system.

2. The emergency electric power supply unit according to claim 1 wherein, the emergency controlling circuit is comprised of:
    a malfunction determining means for determining the time of the malfunction of the main electric power supply system;
    an auxiliary electric power supply controlling means for controlling the discharging circuit so that the electric power from the auxiliary electric power supply is supplied to the auxiliary machinery at the time of the malfunction of the main electric power supply system; and an emergency controlling means for controlling the operation of the auxiliary machinery in response to the operational state of the industrial apparatus at the time of the malfunction of the main electric power supply system.

3. The emergency electric power supply unit according to claim 1 further comprising an emergency detector for detecting an operational state of the auxiliary machinery at the time of the malfunction of the main electric power supply system, wherein the operational state of the industrial apparatus includes the operational state of the auxiliary machinery.

4. The emergency electric power supply unit according to claim 3 wherein, the emergency controlling circuit is comprised of a communication means for transmitting the information for informing the malfunction of the main electric power supply system through a communication circuit.

5. The emergency electric power supply unit according to claim 1 wherein, the industrial apparatus is a vehicle and the auxiliary machinery is a motor providing assisting force to a steering shaft, the emergency electric power supply unit further comprises an emergency detector for detecting a steering state at the time of the malfunction of the main electric power supply system, and wherein the emergency controlling circuit controls the operation of the motor in response to a signal of the emergency detector.

6. The emergency electric power supply unit according to claim 1 wherein, the industrial apparatus is a vehicle and the auxiliary machinery is a lamp of the vehicle, the emergency electric power supply unit further comprises a main switch and an auxiliary switch interveningly provided to the main electric power supply system, and wherein the lamp is turned on by the electric power from the main electric power supply through the main switch at the time of the normal operation during which the main electric power supply system is normally operated, and the lamp is turned on by the electric power from the auxiliary electric power supply through the auxiliary switch at the time of the malfunction of the main electric power supply system.

* * * * *